United States Patent [19]

Senatro

[11] Patent Number: 4,489,960
[45] Date of Patent: Dec. 25, 1984

[54] FLAMMABLE FLUID LEAK DEFLECTOR

[75] Inventor: Clement A. Senatro, Newington, Conn.

[73] Assignee: United Technologies Corporation, Hartford, Conn.

[21] Appl. No.: 348,891

[22] Filed: Feb. 16, 1982

[51] Int. Cl.³ .............................................. F16L 55/00
[52] U.S. Cl. ......................................... 285/45; 285/13
[58] Field of Search .................................... 285/13, 45

[56] References Cited

U.S. PATENT DOCUMENTS

| 2,739,018 | 3/1956 | Collett | 285/45 X |
| 3,367,358 | 2/1968 | Rentschler | 285/45 X |
| 3,913,949 | 10/1975 | Genatro | 285/14 |
| 4,350,372 | 9/1982 | Logsdon | 285/45 |

FOREIGN PATENT DOCUMENTS 1046191 12/1953 France ................................... 285/45

Primary Examiner—Richard J. Scanlan, Jr.
Attorney, Agent, or Firm—Stephen E. Revis

[57] ABSTRACT

A flammable fluid carrying tube has one of its ends disposed within a tube coupling which is adjacent a hot surface of the gas turbine engine. A flammable fluid deflector is disposed between the coupling and the hot surface for deflecting, away from the hot surface, any fluid which may leak from the coupling. The deflector includes an axially extending portion disposed against the tube outer surface adjacent the coupling, the axially extending portion including a circumferentially extending tab which fits into a corresponding slot in an arcuate positioning sleeve which is bonded to that surface of the tube facing away from the hot engine surface and which positions the deflector axially and circumferentially. A standard clamp secures the deflector to the tube. The deflector may be used with virtually any standard coupling and replaces expensive concentric tube designs which utilize special couplings and dual seals for redundancy.

1 Claim, 2 Drawing Figures

FLAMMABLE FLUID LEAK DEFLECTOR

DESCRIPTION

1. Technical Field

This invention relates to apparatus for deflecting flammable fluid leaks from tube couplings.

2. Background Art

Leaking flammable fluid, such as fuel or oil which splashes on a hot surface of a gas turbine engine poses a serious fire hazard. The greatest risks of flammable fluid leakage are from fuel or oil lines where they are coupled to each other or to other apparatus, such as to the inlet of a fuel nozzle. In the prior art, protection from flammable fluid leakage at tube joints is provided by concentric tube designs with special couplings and dual seals for redundancy. An example of such a tube joint is described in commonly owned U.S. Pat. No. 3,913,949 by the same inventor as the present application, C. A. Senatro. These specially designed couplings can be very expensive.

It is also well known in the prior art, although not in the gas turbine engine art, to provide shields to deflect leaking fluid from one direction to another. Examples of such shields are described and shown in U.S. Pat. Nos. 1,572,678 to Pordon and 3,471,060 to Wright. Other patents which include various showings of leakage diverting and deflecting means for various applications and which are only of general interest as regards the present invention are: U.S. Pat. Nos. 2,228,015; 2,578,501; 2,705,397; 2,787,885; 2,949,736; 3,178,153; 3,307,574; and 3,371,482.

DISCLOSURE OF INVENTION

An object of the present invention is apparatus for preventing flammable fluid which leaks from tube joints from contacting hot engine parts.

Another object of the present invention is apparatus for preventing flammable fluid leaking from tube joints formed by standard tube couplings from contacting hot gas turbine engine parts.

A further object of the present invention is a flammable fluid leak deflector which can be used with standard couplings to prevent fuel or oil leaking from the coupling from splashing on adjacent hot gas turbine engine parts.

According to the present invention, a flammable fluid carrying tube has one of its ends disposed within a tube coupling which is adjacent a hot surface of a gas turbine engine, wherein a deflector is disposed between the coupling and the hot surface for deflecting leaking fluid away from the hot surface, the deflector including an axially extending portion disposed against the tube outer surface adjacent the coupling, the axially extending portion including a circumferentially extending tab which fits into a corresponding slot in an arcuate positioning sleeve which is bonded to that surface of the tube facing away from the hot engine surface and which positions the deflector axially and circumferentially, the apparatus also including clamp means surrounding the axially extending portion and tube for securing the deflector to the tube.

An important advantage of the present invention is that the deflector is inexpensive and can be used with virtually any standard or even non-standard tube coupling.

A further advantage of the present invention is the ease with which the deflector can be installed.

Yet another advantage of the present invention is that proper installation of the deflector is foolproof.

The foregoing and other objects, features and advantages of the present invention will become more apparent in the light of the following detailed description of the preferred embodiments thereof as shown in the accompanying drawing.

BEST MODE FOR CARRYING OUT THE INVENTION

Figure 1:
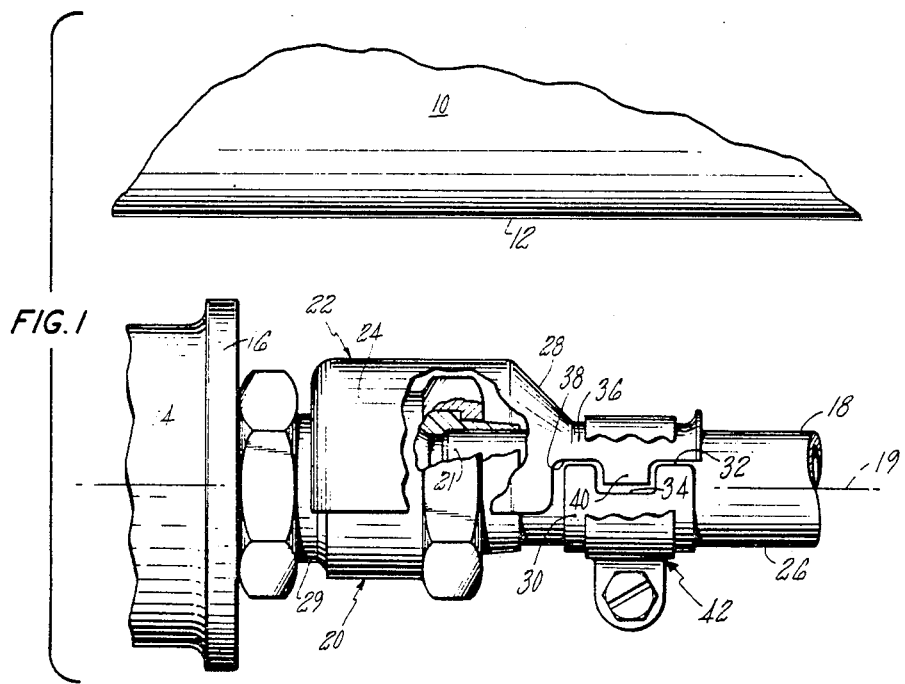
FIG. 1 is a side elevation view, partly schematic and partly broken away showing a fuel line coupling in combination with a fuel leak deflector adjacent a hot surface in a gas turbine engine in accordance with the present invention.

Referring to FIG. 1, a portion of a burner case is schematically shown and labeled with the reference numeral 10 and includes a hot outer surface 12. A portion of a fuel nozzle assembly is shown schematically and is labeled with the reference numeral 14 and includes a boss 16. Fuel enters the fuel nozzle assembly 14 through an opening (not shown) in the boss 16. A fuel line or tube 18, having an axis 19, carries fuel to the fuel nozzle assembly 14 and is interconnected to the fuel nozzle assembly 14 via a coupling 20 which forms a tube joint with the end 21 of the tube 18. The coupling 20 may be of most any design, standard or otherwise, and provides a seal around the end 21 of the tube 18 to prevent leakage outside the coupling in a manner well known in the art. The construction of the coupling is not considered to be a part of the present invention. In rare instances the seal may fail or the tube may crack within or immediately adjacent the coupling whereby fuel may be sprayed in virtually any direction. A fuel deflector 22 is provided around the coupling 20 to deflect this leaking fuel away from the hot surface 12, which is hot enough to ignite the fuel.

Figure 2:
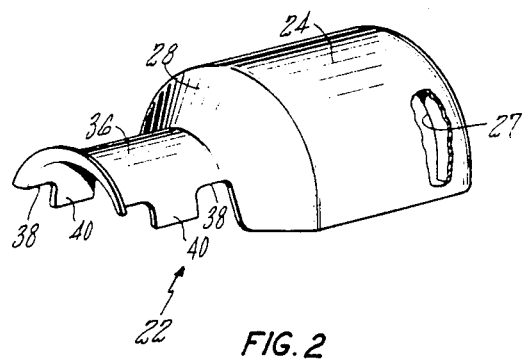
FIG. 2 is a perspective view of the apparatus of FIG. 1.

The deflector 22 includes a sheet metal arcuate portion 24 surrounding that portion of the coupling 20 facing the hot surface 12. The arcuate portion 24 is substantially cylindrical in shape over the axial length of the coupling 20 and thereafter tapers conically inwardly at one end, as at 28, toward the outer surface 26 of the tube 18. The other end of the arcuate portion 24 includes a radially inwardly extending annular lip 27 (FIG. 2) which closely fits around a cylindrical portion 29 of the coupling 20.

An arcuate sleeve segment 30 is brazed or otherwise bonded to the surface 26 of the tube 18 adjacent the coupling 20 on the side of the tube 18 facing away from the hot surface 12. The segment 30 includes a pair of axially extending, circumferentially spaced apart edges 32, each edge having a cutout 34 therein. The deflector 22 includes an arcuate axial extension 36 disposed against the surface 26 of the tube 18 between the edges 32 of the segment 30. The extension 36 includes a pair of circumferentially spaced apart axially extending edges 38 substantially abutting the axially extending edges 32 of the segment 30. This prevents rotation of the deflector 22. Each edge 38 includes a tab 40 extending circumferentially away from the edge 38 into the cutout 34 of the abutting edge 32. This prevents the deflector 22 from moving axially. Assuming the segment 30 has been properly positioned and bonded to the tube 18, the correct axial and circumferential position of the deflector 22 is assured. A clamp 42 surrounds the extension 36 and sleeve segment 30 and holds the deflector 22 against the tube 18.

Although the invention has been shown and described with respect to a preferred embodiment thereof, it should be understood by those skilled in the art that other various changes and omissions in the form and detail thereof may be made therein without departing from the spirit and the scope of the invention.

I claim:
1. In a gas turbine engine the combination of:
  means defining a hot surface;
  a flammable fluid carrying tube having an axis, an end, an outer surface, said tube end being closely spaced from said hot surface;
  tube coupling means surrounding said tube end forming a tube joint;
  an arcuate sleeve segment axially adjacent said tube coupling and disposed against and bonded to that portion of said tube outer surface facing away from said hot surface, said sleeve segment having axially extending circumferentially spaced apart edges, at least one of said edges including a cutout therein;
  an arcuate deflector disposed between said coupling means and said hot surface, partially surrounding said coupling means for deflecting away from said hot surface, flammable fluid leaking from said tube joint, one end of said deflector including an arcuate, axial extension disposed against said tube outer surface and having circumferentially spaced apart axially extending edges substantially abutting the axially extending edges of said sleeve segment to orient said deflector circumferentially, one of said extension edges including a tab extending circumferentially outwardly therefrom into said sleeve segment cutout for positioning said deflector axially; and
  clamp means surrounding said extension for securing said deflector to said tube.

* * * * *